United States Patent
Li et al.

(10) Patent No.: US 10,764,411 B2
(45) Date of Patent: Sep. 1, 2020

(54) STREAM CONTROL TRANSMISSION PROTOCOL SCTP-BASED COMMUNICATIONS METHOD AND SYSTEM, AND APPARATUS

(71) Applicant: Huawei Technologies Co., Ltd., Shenzhen, Guangdong (CN)

(72) Inventors: Yan Li, Beijing (CN); Xiaoqiang Qiao, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 63 days.

(21) Appl. No.: 15/998,591

(22) Filed: Aug. 16, 2018

(65) Prior Publication Data
US 2018/0367651 A1    Dec. 20, 2018

Related U.S. Application Data

(63) Continuation of application No. PCT/CN2016/073871, filed on Feb. 16, 2016.

(51) Int. Cl.
    *H04L 29/06*    (2006.01)
    *H04L 29/08*    (2006.01)
    *H04W 92/14*    (2009.01)

(52) U.S. Cl.
    CPC .......... *H04L 69/26* (2013.01); *H04L 67/1002* (2013.01); *H04L 67/1027* (2013.01); *H04L 67/42* (2013.01); *H04W 92/14* (2013.01)

(58) Field of Classification Search
    CPC ..... H04L 67/1027; H04L 69/26; H04L 67/42; H04L 67/1002; H04W 92/14
    See application file for complete search history.

(56) References Cited

U.S. PATENT DOCUMENTS

| | | | |
|---|---|---|---|
| 2004/0103194 A1* | 5/2004 | Islam | G06F 9/505 709/225 |
| 2009/0265467 A1* | 10/2009 | Peles | H04L 47/10 709/226 |

(Continued)

FOREIGN PATENT DOCUMENTS

| | | |
|---|---|---|
| CN | 101304436 A | 11/2008 |
| CN | 101677292 A | 3/2010 |

(Continued)

OTHER PUBLICATIONS

R. Stewart, Ed., "Stream Control Transmission Protocol", Sep. 2007, 152 pages, RFC4960.

(Continued)

*Primary Examiner* — Abdullahi E Salad
(74) *Attorney, Agent, or Firm* — Fish & Richardson P.C.

(57) ABSTRACT

The present disclosure discloses an SCTP-based communications method and system, and an apparatus. The method includes: A network element selector receives an SCTP packet that includes a plurality of SCTP data chunks of a plurality of user terminals. Because each SCTP data chunk carries index information, the network element selector may select a service providing device for each user terminal based on the index information carried in each SCTP data chunk. Therefore, application layer messages of different user terminals in the SCTP may be routed to different servers based on LBI parameters, and corresponding session persistence is implemented in a subsequent interaction process.

16 Claims, 11 Drawing Sheets

(56) References Cited

U.S. PATENT DOCUMENTS

| | | | |
|---|---|---|---|
| 2011/0185065 A1 | 7/2011 | Stanisic et al. | |
| 2012/0066389 A1* | 3/2012 | Hegde | G06F 9/4856 709/226 |
| 2012/0233240 A1* | 9/2012 | Chatilla | H04L 67/1027 709/203 |
| 2013/0339540 A1 | 12/2013 | Sheer | |
| 2016/0057226 A1* | 2/2016 | Bestler | G06F 11/1076 709/217 |
| 2016/0188591 A1* | 6/2016 | Bestler | G06F 16/2255 707/744 |
| 2016/0191508 A1* | 6/2016 | Bestler | G06F 16/2255 713/163 |
| 2017/0331665 A1* | 11/2017 | Porfiri | H04L 69/16 |

FOREIGN PATENT DOCUMENTS

| | | |
|---|---|---|
| CN | 103004172 A | 3/2013 |
| CN | 103457869 A | 12/2013 |
| CN | 104202771 A | 12/2014 |

OTHER PUBLICATIONS

R. Stewart et al., "Stream Control Transmission Protocol", Oct. 2000, 134 pages, RFC2960.

Office Action issued in Chinese Application No. 201680077411.8 dated Nov. 5, 2019, 22 pages (Wtih English Translation).

\* cited by examiner

STREAM CONTROL TRANSMISSION PROTOCOL SCTP-BASED COMMUNICATIONS METHOD AND SYSTEM, AND APPARATUS

CROSS-REFERENCE TO RELATED APPLICATIONS

This application is a continuation of International Application No. PCT/CN2016/073871, filed on Feb. 16, 2016, the disclosure of which is hereby incorporated by reference in its entirety.

TECHNICAL FIELD

The present disclosure relates to the field of wireless communications technologies, and specifically, to an SCTP-based method and system, and an apparatus.

BACKGROUND

With popularization and rapid development of the Internet, especially development of commercial application services of the Internet, a network-based information requirement rapidly increases, and therefore a stricter requirement is imposed on a processing capability, a response capability, and the like of a service providing device in a network. The service providing device may also be referred to as a server. The server needs to meet access requirements of mass user terminals and provide stable and favorable network application services for the user terminals. A manner of improving a processing capability of the server is using a cluster technology. A plurality of servers constitute a server cluster. The servers provide a same or similar network application service. The plurality of servers obtain relatively high processing capabilities and response capabilities through concurrent computing.

A load balancing technology is a key part of a cluster system. Generally, as shown in FIG. 1, a network element selector (which may also be referred to as a load balancer) is deployed in the front end of a server cluster. The network element selector distributes, in the server cluster based on a preconfigured balancing policy, a user request sent by a user terminal by using a host client endpoint (Host), to provide an application service for the user terminal.

The Stream Control Transmission Protocol (SCTP) is a new-generation transmission protocol, and implements transmission of a reliable end-to-end message flow oriented to an association. SCTP data transmission is in a basic unit of a chunk. Each SCTP packet includes an SCTP common header and at least one chunk. For example, the SCTP packet includes the SCTP common header and at least one data chunk used to transmit user data. FIG. 2A shows a format of an SCTP packet. FIG. 2B shows a format of a data chunk in an SCTP packet. The common header of the SCTP packet includes a source port number, a destination port number, a verification tag, and a checksum.

User data is encapsulated into a data chunk. If a length of the user data is relatively small, a plurality of chunks may be bundled (Chunk Bundling) in a same SCTP packet, in other words, a plurality of data chunks respectively corresponding to a plurality of user terminals share a common header. In the prior art in which a service is provided based on the SCTP, a network element selector identifies an identity of a user terminal by using a verification tag in a common header of an SCTP packet. Therefore, user data that is corresponding to a plurality of user terminals and transmitted in a same SCTP packet is allocated to a same server for processing. Consequently, load between servers is severely imbalanced.

SUMMARY

This specification describes an SCTP-based communications method and system, and an apparatus, to implement load balancing between servers in a server cluster and session persistence.

According to an aspect, an embodiment of this application provides an SCTP-based communications method. The method includes: A network element selector receives an SCTP packet. The SCTP packet includes a plurality of SCTP data chunks of a plurality of user terminals, and each SCTP data chunk carries index information (for example, an LBI parameter). For example, an LBI field may be newly added to the SCTP data chunk to carry the LBI parameter, or the LBI parameter may be encapsulated into user data in the data chunk. The network element selector selects a service providing device (also referred to as a server) for each user terminal based on the index information carried in each SCTP data chunk. Therefore, SCTP data chunks of different user terminals in the SCTP may be routed to different servers based on LBI parameters, to implement load balancing, and implement corresponding session persistence in a subsequent interaction process.

In a possible design, the network element selector may select, based on the index information carried in each SCTP data chunk, the service providing device for each user terminal in either of the following manners:

If index information carried in a first SCTP data chunk sent by a first user terminal in the plurality of user terminals has a first value (for example, an invalid value), the network element selector selects, for the first user terminal based on network load statuses of a plurality of service providing devices, a first device in the plurality of service providing devices to serve as the service providing device.

If index information carried in a second SCTP data chunk of a first user terminal in the plurality of user terminals has a second value, and the index information having the second value is used to identify a second device in a plurality of service providing devices, the network element selector selects, for the first user terminal based on the second value, the second device as the service providing device.

In a possible design, the index information is allocated by the network element selector to the first user terminal. Alternatively, the index information may be allocated by the second device to the first user terminal.

In a possible design, before the network element selector receives the SCTP packet, the method further includes: The network element selector obtains the index information that has the second value and is corresponding to the first user terminal, and sends, to a host client endpoint, an SCTP packet that carries the index information. After receiving the SCTP packet that carries the index information, the host client endpoint records the index information corresponding to the user terminal.

According to another aspect, an embodiment of the present disclosure provides an apparatus. The apparatus has a function of implementing actual behavior of the network element selector in the foregoing method. The function may be implemented by using hardware, or may be implemented by executing corresponding software by using hardware. The hardware or the software includes one or more modules corresponding to the function.

In a possible design, a structure of the network element selector includes a processor and a receiver/transmitter, and the processor is configured to support the network element selector in performing a corresponding function in the foregoing method. The receiver/transmitter is configured to: support communication between the network element selector and a host client endpoint and communication between the network element selector and a server, and send information or an instruction used in the foregoing method. The network element selector may further include a memory. The memory is configured to: couple to the processor, and store a program instruction and data that are necessary for the network element selector.

According to still another aspect, an embodiment of the present disclosure provides a communications system. The system includes the network element selector and the plurality of service providing devices in the foregoing aspects.

According to still another aspect, an embodiment of the present disclosure provides a host client endpoint (for example, implemented by a base station). The host client endpoint may receive an SCTP packet that is sent by a network element selector and that carries the index information, and record index information corresponding to a first user terminal. Optionally, when sending a next SCTP packet to the network element selector, the host client endpoint may add the recorded index information to the SCTP packet.

According to still another aspect, an embodiment of the present disclosure provides a server. The server is located in a server cluster including a plurality of servers. The server may be a network entity in a core network, for example, a mobility management entity MME. The network entity is configured to cooperate with the network element selector to implement a solution in the foregoing method design. For example, after the server receives an application layer request message sent by the network element selector, the server may allocate index information used to identify the server to the first user terminal, and transmit the index information to the network element selector by using a response message, so that the network element selector obtains the index information used to identify the server, thereby implementing subsequent load balancing control and session persistence.

According to yet another aspect, an embodiment of the present disclosure provides a computer storage medium, configured to store a computer software instruction used by the network element selector. The computer software instruction includes a program designed for executing the foregoing aspects.

According to yet another aspect, an embodiment of the present disclosure provides a computer storage medium, configured to store a computer software instruction used by the host client endpoint. The computer software instruction includes a program designed for executing the foregoing aspects.

According to yet another aspect, an embodiment of the present disclosure provides a computer storage medium, configured to store a computer software instruction used by the server. The computer software instruction includes a program designed for executing the foregoing aspects.

According to yet another aspect, an embodiment of the present disclosure provides a data structure of an SCTP data chunk. The SCTP data chunk includes an LBI field, and the LBI field includes an LBI parameter. Alternatively, an LBI parameter is encapsulated into user data in the SCTP data chunk. Therefore, a network element selector may select a corresponding server for a user terminal based on the LBI parameter, to implement load balancing and session persistence.

Compared with the prior art, according to the solutions provided in the present disclosure, application layer messages of different user terminals may be routed to different servers, to implement load balancing, and implement corresponding session persistence in a subsequent interaction process.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description merely show some embodiments of the present disclosure, and a person of ordinary skill in the art can derive other implementations from these accompanying drawings without creative efforts. All these embodiments or implementations shall fall within the protection scope of the present disclosure.

DESCRIPTION OF EMBODIMENTS

Figure 1:
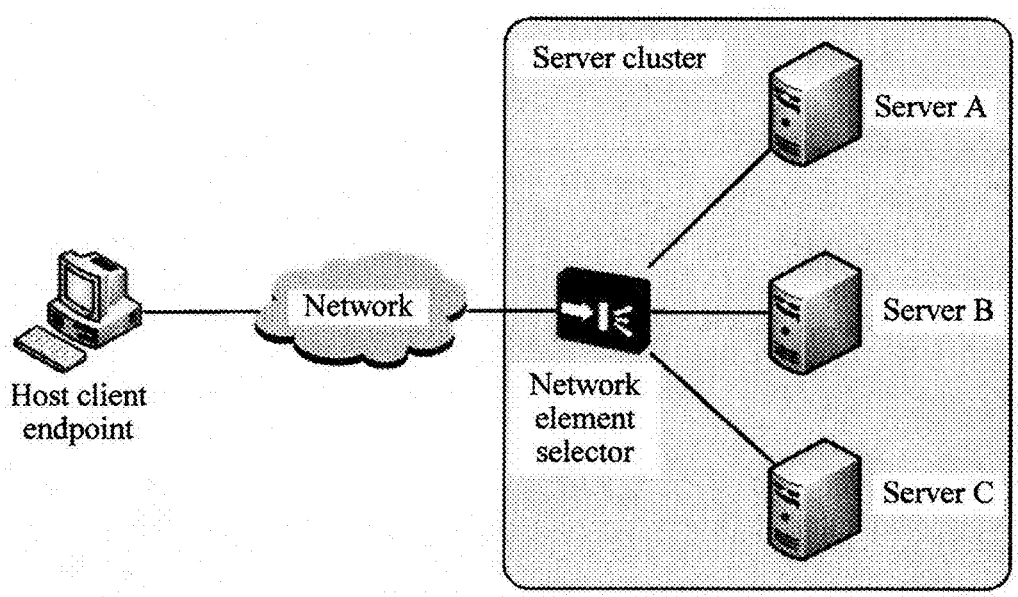
FIG. 1 is a schematic diagram of a communications system that uses a load balancing technology in the prior art.
Figures 2A, 2B:
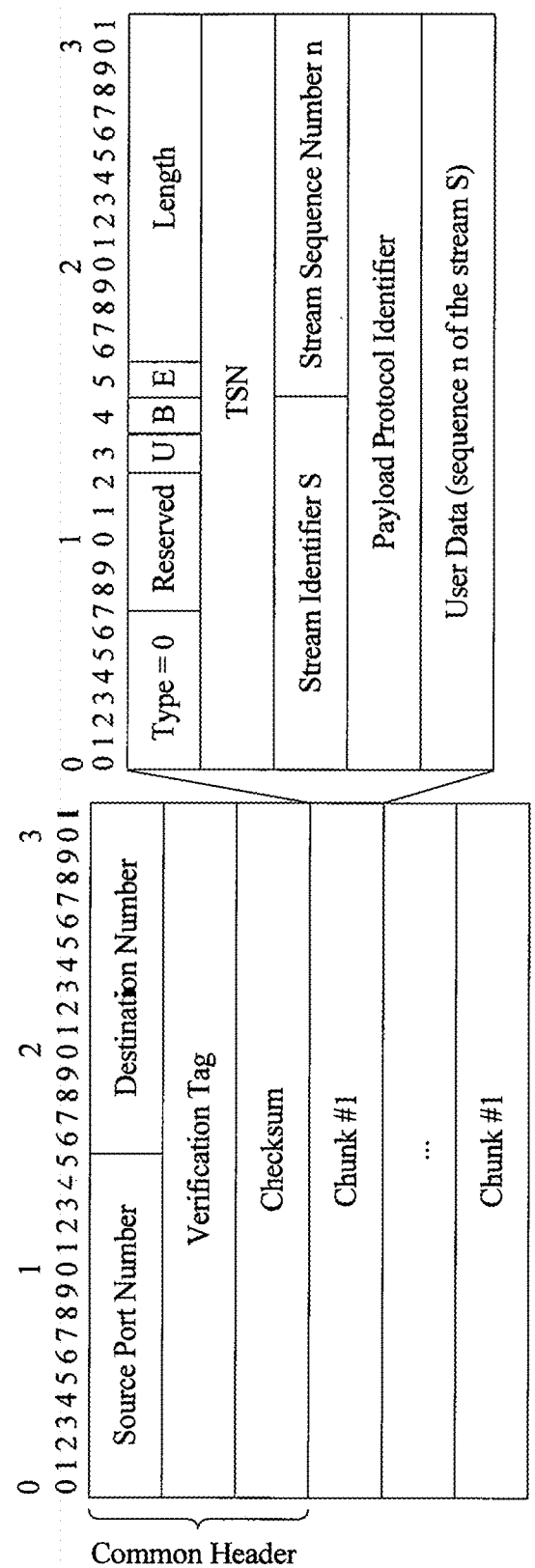
FIG. 2A and FIG. 2B respectively show a format of an SCTP packet and a format of a data chunk in an SCTP packet in the prior art.

The technical solutions according to embodiments of the present disclosure are clearly described in the following with reference to the accompanying drawings. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Network architectures and business scenarios described in the embodiments of the present disclosure aim to more clearly describe the technical solutions in the embodiments of the present disclosure, but are not intended to limit the technical solutions provided in the embodiments of the present disclosure. A person of ordinary skill in the art may know that as the network architectures evolve and a new business scenario emerges, the technical solutions provided in the embodiments of the present disclosure are further applicable to a similar technical problem.

The technologies described in the present disclosure may be applicable to a Long Term Evolution (LTE) system or another wireless communications system that uses various wireless access technologies, for example, a system that uses an access technology such as code division multiple access, frequency division multiple access, orthogonal frequency division multiple access, or single carrier frequency division multiple access. In addition, the technologies described in the present disclosure may be also applicable to an evolved system following the LTE system, for example, a fifth-generation 5G system. For clarity, an example in which the technologies described in the present disclosure are applicable to the LTE system is merely used for description herein. In the LTE system, an evolved UMTS terrestrial radio access network (E-UTRAN) is used as a radio access network, and an evolved packet core (EPC) is used as a core network.

A user terminal (used in this application may be any handheld device, in-vehicle device, wearable device, or computing device that has a wireless communication function, or another processing device connected to a wireless modem. The user terminal may also be referred to as user equipment (UE), a mobile station (MS), a terminal, terminal equipment, or the like. For ease of description, in this application, the devices mentioned above are collectively referred to as user terminals.

A base station (BS) used in this application is an apparatus that is deployed in a radio access network and that is configured to provide a wireless communication function for the user terminal. The base station may include a macro base station, a micro base station, a relay station, an access point, and the like that are in various forms. In systems that use different wireless access technologies, a device having a function of the base station may have different names. For example, in a LTE network, the device is referred to as an evolved NodeB (eNB or eNodeB); in a third-generation 3G network, the device is referred to as a NodeB; and so on. For ease of description, in this application, the foregoing apparatuses that provide wireless communication functions for the user terminal are collectively referred to as base stations.

Figure 3:
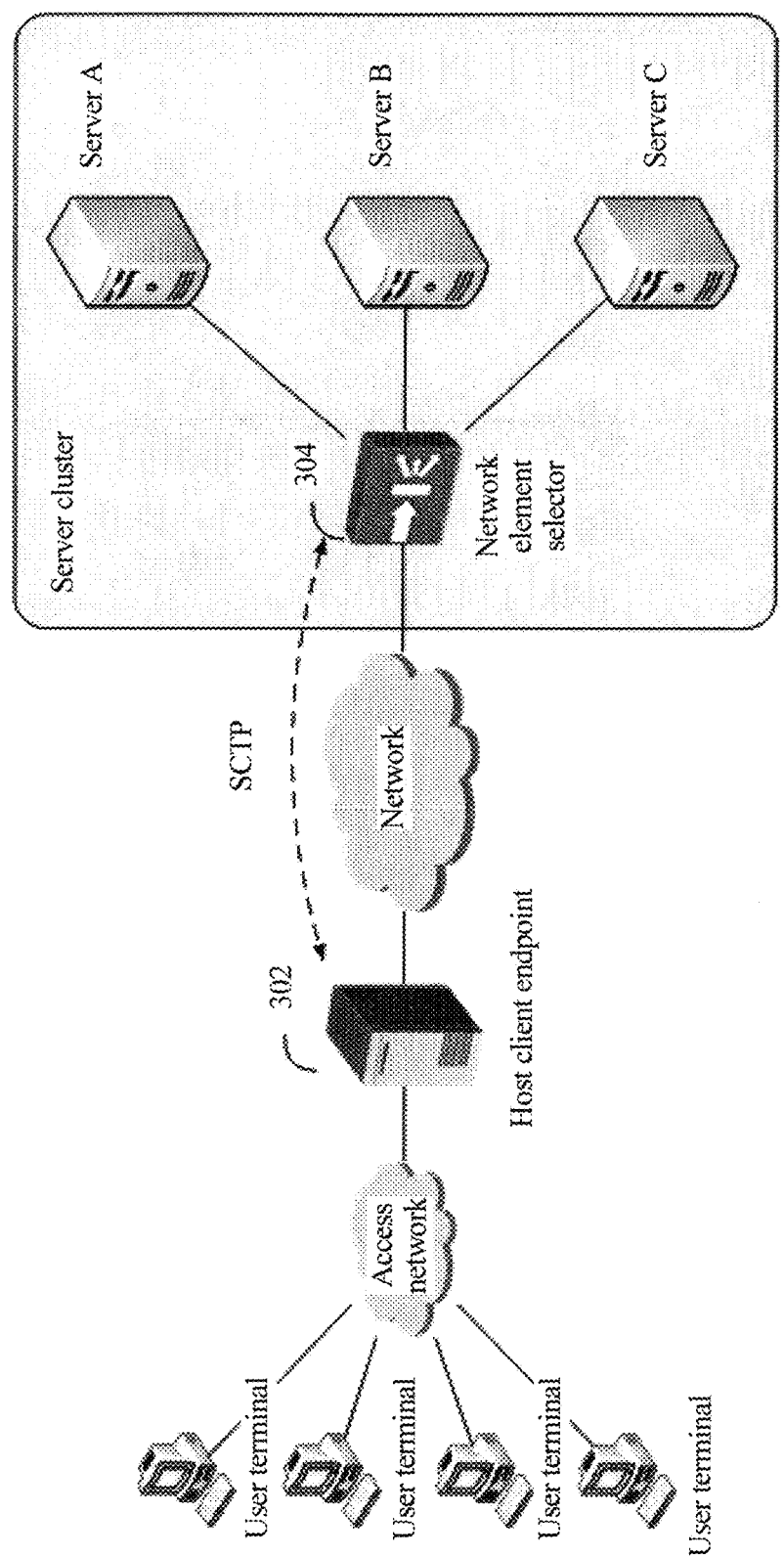
FIG. 3 is a schematic diagram of a network architecture for providing a service based on the SCTP according to the present disclosure.

FIG. 3 is a schematic diagram of a network architecture for providing services for a plurality of user terminals based on the SCTP. The network architecture uses a cluster technology in which a plurality of servers (for example, a server A, a server B, and a server C) constitute a server cluster. The servers provide a same or similar network service. The plurality of servers obtain high processing capabilities and response capabilities through concurrent computing.

In FIG. 3, the plurality of user terminals access a network and access a server by using a same host client endpoint 302 (which may also be referred to as a host). For example, when accessing the server by using a proxy or through network address translation (NAT), the plurality of user terminals access the server by using the same host client endpoint 302.

An independent network element selector 304 (which may also be referred to as a load balancer or a front-end node) is disposed in the front end of the server cluster. The network element selector 304 distributes user data of each user terminal in the server cluster, and provides a service (for example, a network application service) for the user terminal, to implement average workload allocation in the server cluster.

For example, when the network architecture in FIG. 3 is applied to an LTE network, the host client endpoint 302 may be implemented by a base station, and the server may be implemented by a mobility management entity (MME).

The SCTP is used as a transport layer bearer protocol between the host client endpoint 302 and the network element selector 304. An SCTP endpoint is a logical sender and receiver of an SCTP packet, to be specific, the host client endpoint 302 and the network element selector 304 in FIG. 3 are SCTP endpoints.

SCTP data transmission is in a basic unit of a chunk. Each SCTP packet includes an SCTP common header and at least one chunk. There are two basic types of chunks, namely, a control chunk and a data chunk. The control chunk is used for SCTP association control, including association establishment and disablement, transmission path maintenance, and the like. The data chunk is used to transmit user data of an application layer. For example, the user data of the application layer includes various application layer messages.

The application layer message is encapsulated into the data chunk. If a length of the application layer message is greater than that of a maximum transmission unit (MTU) in a transmission path, the application layer message is split and transmitted by using a plurality of data chunks. After receiving the data chunks, the network element selector 304 first assembles the plurality of split data chunks, and then performs subsequent processing. A data chunk is encapsulated into each SCTP packet in the foregoing case. If the length of the application layer message is less than that of the MTU, a plurality of data chunks may be bundled in a same SCTP packet. For example, when the plurality of user terminals access the server by using the proxy or through the NAT, a plurality of data chunks of the plurality of user terminals may be bundled in a same SCTP packet.

In addition, a plurality of interaction processes often need to be performed between the host client endpoint 302 and the server, to complete an application service. These interaction processes are closely related to an identity of a user terminal. In addition, when performing specific steps of these interaction processes, the server usually needs to know a processing result of a previous interaction process or results of several previous interaction processes. Therefore, user data of a user terminal needs to be forwarded to a same server for completion, and cannot be forwarded by the network element selector to different servers for processing. This mechanism is referred to as session persistence.

This application is applicable to the foregoing scenario in which the plurality of data chunks of the plurality of user terminals are bundled in the same SCTP packet. For example, an SCTP packet includes a data chunk 1 of a first user terminal and a data chunk 2 of a second user terminal. However, the present disclosure is not limited thereto. An SCTP packet may include a plurality of data chunks of another quantity of user terminals based on a length of a data chunk. This is not limited in the present disclosure.

In the example of FIG. 3, the SCTP is used as the transport layer bearer protocol between the host client endpoint 302 and the network element selector 304. However, a transmission protocol between the network element selector 304 and each server is not limited in this application. For example, an SCTP packet transmitted between the host client endpoint 302 and the network element selector 304 includes the data chunk 1 of the first user terminal and the data chunk 2 of the second user terminal. The data chunk 1 or the data chunk 2 in this embodiment of the present disclosure is in a format shown in FIG. 4A.

A type of the data chunk is 0. U, B and E are transmission processing marks. A transmission sequence number (TSN) is used to acknowledge data transmission. A stream identifier and a stream sequence number (SNN) are separately used to identify a packet sequence relationship between streams in an SCTP technology. A payload protocol identifier (PPI) is used to indicate an application (or an upper layer protocol)-specific protocol identifier. The foregoing descriptions all belong to the prior art, and details are not described herein.

Figure 4A:
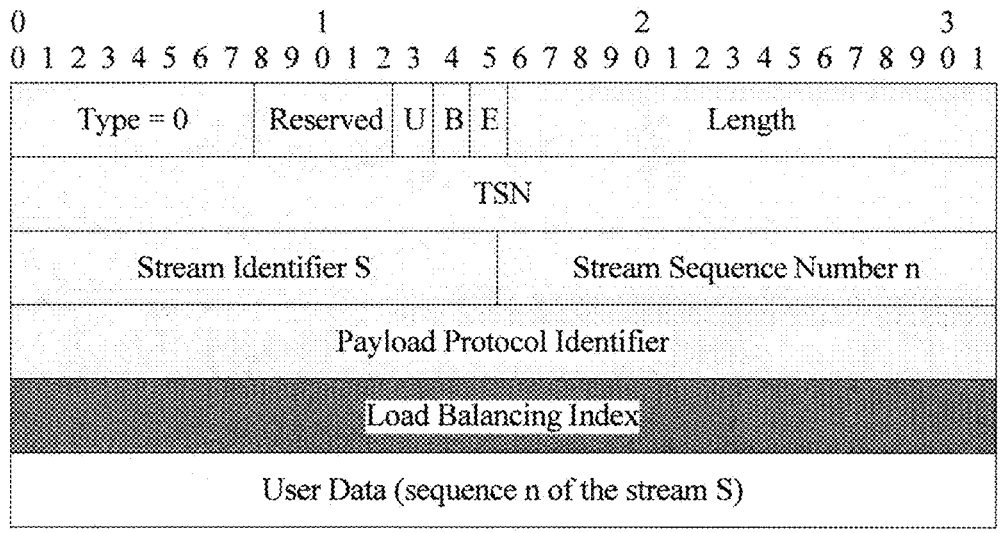
FIG. 4A is a schematic diagram of a format of a data chunk in an SCTP packet according to an embodiment of the present disclosure.

As shown in FIG. 4A, according to a communications method in the present disclosure, index information is added to a format of a data chunk in a packet by extending an SCTP packet protocol. For example, the index information is a load balancing index (LBI) parameter.

Figure 4B:
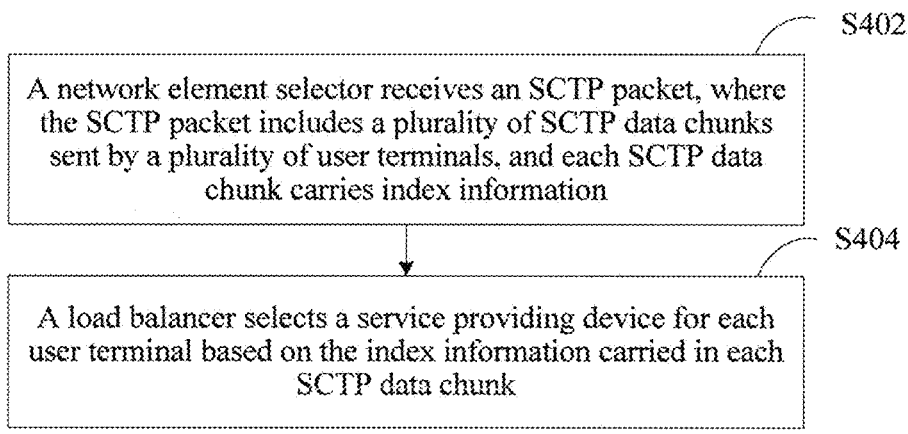
FIG. 4B is a schematic flowchart of a communications method according to an embodiment of the present disclosure.

With reference to a schematic flowchart shown in FIG. 4B, in step S402, a network element selector 304 receives an SCTP packet that includes a plurality of SCTP data chunks of a plurality of user terminals. Because each SCTP data chunk carries index information, in step S404, the network element selector 304 may select a service providing device for each user terminal based on the index information carried in each SCTP data chunk.

For example, when the network element selector 304 receives a first application layer request message of the user terminal, an LBI parameter corresponding to each user terminal is an invalid value, and the network element selector 304 selects a server for each user terminal based on a network load status of each server in a server cluster, and forwards the application layer request message. Then, the network element selector 304 or the selected server allocates an LBI parameter to the corresponding user terminal, and returns the allocated LBI parameter to a host client endpoint 302 by using a data chunk. In a subsequent interaction process, when the host client endpoint 302 sends a next data chunk of the user terminal, the data chunk carries the LBI parameter corresponding to the user terminal. Therefore, the network element selector 304 may select, for the user terminal based on the LBI parameter, a server corresponding to an interaction session of the user terminal.

Therefore, the present disclosure provides a corresponding solution to a prior-art problem that load balancing of a plurality of user messages in the SCTP and session persistence cannot be implemented, so that application layer messages of different user terminals in the SCTP can be routed to different servers based on LBI parameters, thereby implementing load balancing, and implementing corresponding session persistence in a subsequent interaction process.

Figure 5:
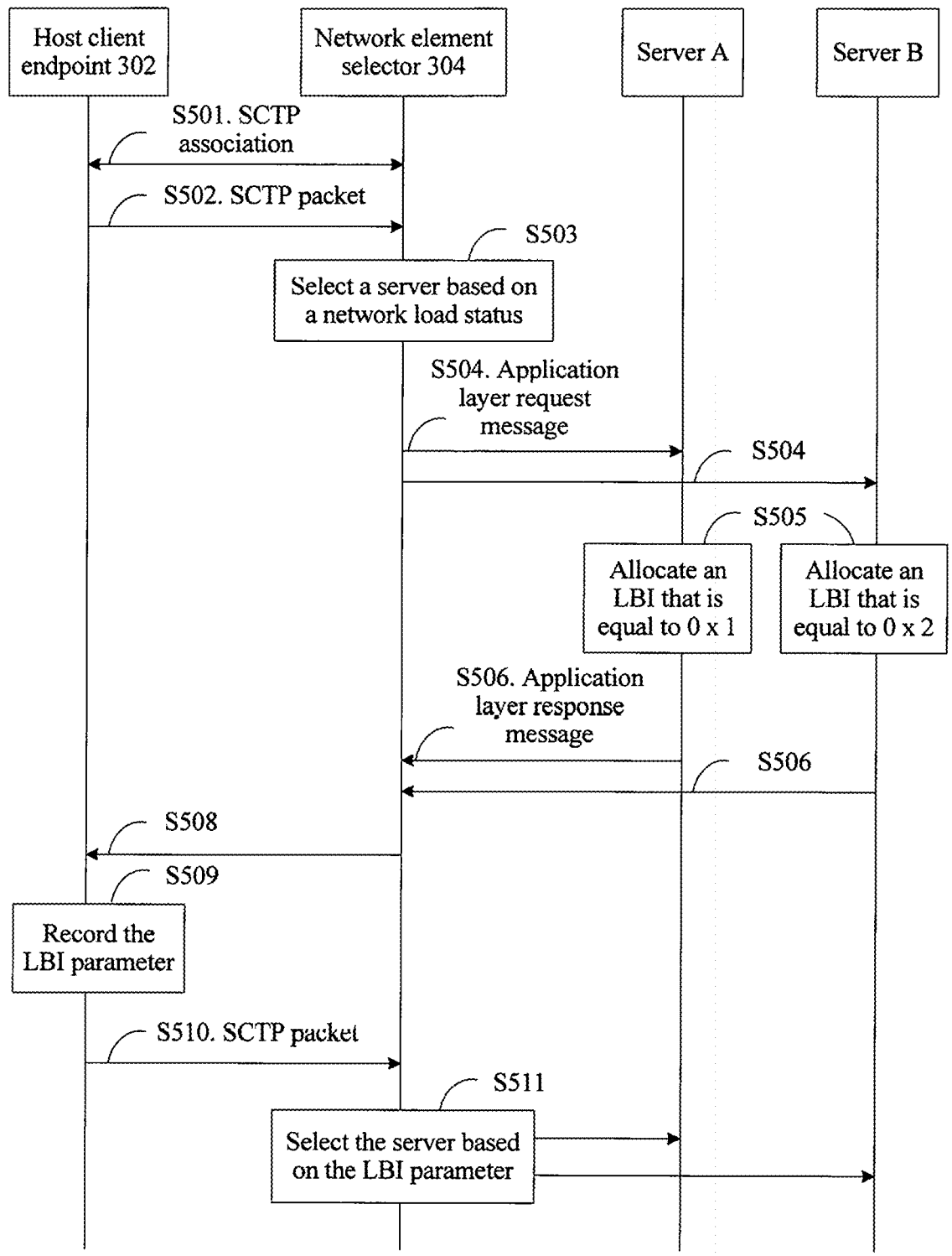
FIG. 5 is a schematic flowchart of an SCTP-based communications method according to an embodiment of the present disclosure.
Figure 6:
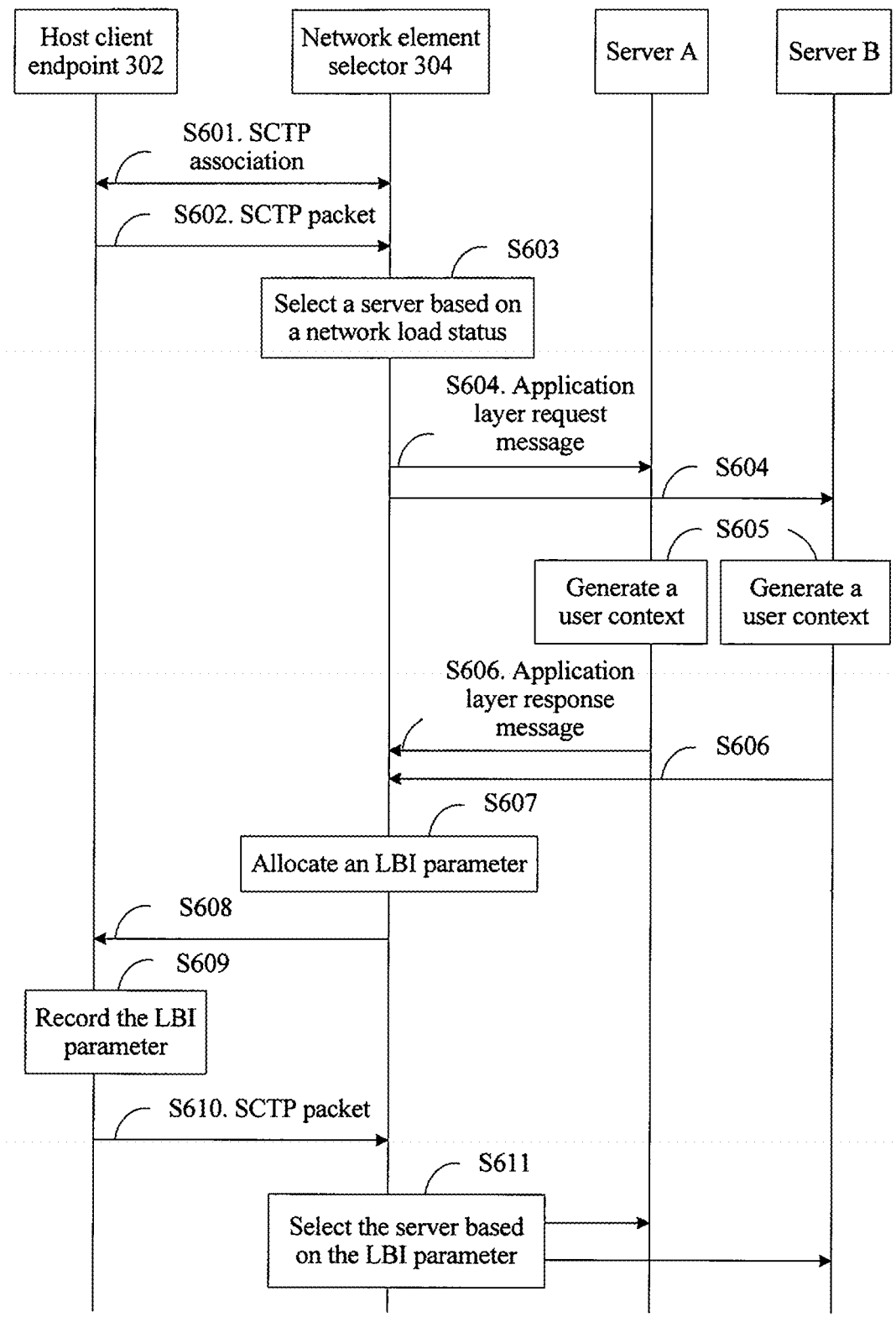
FIG. 6 is a schematic flowchart of another SCTP-based communications method according to an embodiment of the present disclosure.
Figure 7:
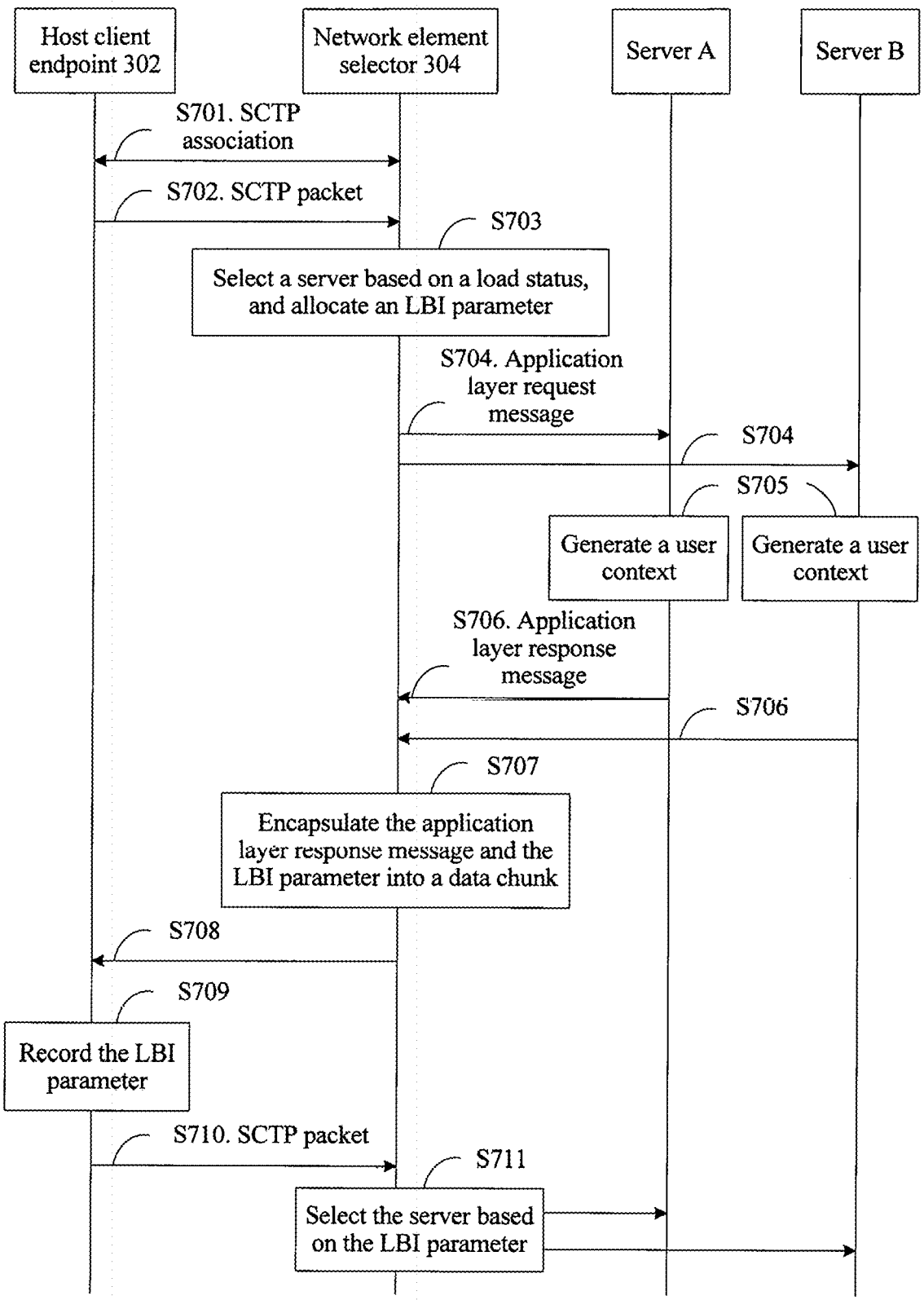
FIG. 7 is a schematic flowchart of still another SCTP-based communications method according to an embodiment of the present disclosure.

The following describes the solutions provided in the embodiments of the present disclosure with reference to FIG. 5 to FIG. 7.

Method steps in FIG. 5 to FIG. 7 are cooperatively completed by the host client endpoint 302, the network element selector 304, and each server in the server cluster in FIG. 3. In an example of FIG. 5, the server cluster includes a server A and a server B. However, the present disclosure is not limited thereto. The server cluster may further include another quantity of servers.

As shown in FIG. 5, an SCTP-based communications method includes the following steps.

Step S501. Establish an SCTP association between a host client endpoint (Host) and a network element selector.

The association is used to identify a logical relationship between two SCTP endpoints (namely, the host client endpoint 302 and the network element selector 304). For example, the association may be established by using a four-way handshake mechanism specified by the SCTP. How to establish the association by using the four-way handshake mechanism specified in the SCTP belongs to the prior art. Details are not described herein.

Step S502. The host client endpoint 302 sends an SCTP packet to the network element selector 304 by using the established SCTP association. The SCTP packet includes a plurality of SCTP data chunks of a plurality of user terminals. The plurality of data chunks are received by the host client endpoint 302 from the plurality of user terminals. Each user terminal may send one data chunk or a plurality of data chunks to the host client endpoint 302. Because a length of the data chunk is relatively small, the host client endpoint 302 bundles the plurality of data chunks of the plurality of user terminals in the SCTP packet, and sends the SCTP packet to the network element selector 304. For example, the SCTP packet sent in step S502 includes a data chunk 1 of a first user terminal and a data chunk 2 of a second user terminal.

User data is encapsulated into each data chunk. The user data includes an application layer message. For example, because first interaction occurs in step 502, the user data is an application layer request message.

The SCTP packet sent by the host client endpoint 302 in step 502 is in a format shown in FIG. 4A. However, because no LBI parameter is allocated to the user terminal in a context, the data chunk of each user terminal carries an invalid LBI parameter. For example, when the LBI parameter is 0, it indicates that the parameter is invalid.

Step S503. The network element selector 304 parses a data chunk of each user terminal in the SCTP packet, and determines that an LBI parameter in the data chunk is a first value (for example, the first value is an invalid value), and the network element selector 304 selects a service providing server for each user terminal based on network load statuses of a plurality of servers in a server cluster. For example, a load balancer 304 selects a lightly loaded server A for the first user terminal, and selects a server B for the second user terminal.

Step S504. A load balancer 304 sends an application layer request message of the user terminal to each server. For example, the load balancer 304 sends an application layer request message of the first user terminal to the server A, and sends an application layer request message of the second user terminal to the server B.

It should be noted that a transmission manner between the load balancer 304 and the server is not limited herein. The application layer request message between the load balancer 304 and the server may be sent based on the SCTP, or may be sent in another manner. For example, the application layer request message between the load balancer 304 and the server may be sent based on an extended transmission protocol. If the application layer request message between the load balancer 304 and the server is sent based on the SCTP, it is assumed that the SCTP packet further includes a data chunk of a third user terminal, and the network element selector also selects the server A for the third user terminal based on a load status. If a length of the application layer request message of the first user terminal and a length of an application layer request message of the third user terminal are relatively small, an SCTP packet sent by the network element selector 304 to the server A may include both the application layer request message of the first user terminal and the application layer request message of the third user terminal. Alternatively, the application layer request message of the first user terminal and the application layer request message of the third user terminal may be separately sent.

Step S505. A server A processes an application layer request message of a first user terminal, and generates a user context. In addition, the server A further allocates, to the first user terminal, an LBI parameter used to identify the server A. For example, the LBI parameter allocated by the server A to the first user terminal is equal to 0×1. That the LBI parameter is equal to 0×1 is used to indicate that the data chunk of the first user terminal is already processed by the server A.

Likewise, the server B processes the application layer request message of the second user terminal, and generates a user context. In addition, the server B further allocates, to the second user terminal, an LBI parameter used to identify the server B. For example, the LBI parameter allocated by the server B to the second user terminal is equal to 0×2. That the LBI parameter is equal to 0×2 is used to indicate that the data chunk of the second user terminal is already processed by the server B.

A rule used by the server to allocate an LBI parameter may be preconfigured in the server and the network element selector. In other words, the server may allocate a corresponding LBI parameter to each user terminal according to a preconfigured rule.

Step S506. Each server returns an application layer response message to the network element selector 304. Correspondingly, the network element selector 304 receives the application layer response message returned by each server. The application layer response message carries the LBI parameter corresponding to each user terminal.

For example, an LBI parameter carried in an application layer response message returned by the server A to the network element selector 304 is equal to 0×1, and an LBI parameter carried in an application layer response message returned by the server B to the network element selector 304 is equal to 0×2.

Similar to step S504, a transmission protocol used for the application layer response message transmitted by the server to the network element selector 304 in step S506 is not limited herein. Details are not described herein.

Step S508. The network element selector 304 sends, to a host client endpoint 302 by using the SCTP association, an SCTP packet that carries the LBI parameter, so that the host client endpoint 302 records an LBI parameter corresponding to each user terminal.

The SCTP is used as a transmission protocol in step S508. Optionally, the network element selector 304 may directly encapsulate the LBI parameter into the user data in the data chunk. Alternatively, the network element selector may use a format shown in FIG. 4A to add an LBI field to the data chunk, and transmit the LBI parameter to the host client endpoint 302 by using the LBI field.

For example, the network element selector receives a plurality of response messages in step S506. The network element selector 304 may determine, based on a length of each response message, whether the plurality of response messages sent to the plurality of user terminals are sent by using one SCTP packet.

If the plurality of response messages of the plurality of user terminals are sent by using the one SCTP packet, the SCTP packet in step S508 includes a plurality of data chunks, each data chunk is used to transmit a response message, and the SCTP packet is in a format shown in FIG. 4A. Because the server already allocates the LBI parameter, each data chunk in the SCTP packet carries a corresponding LBI parameter having a second value. For example, an LBI parameter carried in the data chunk of the first user terminal (namely, an application layer response message that is to be sent to the first user terminal) in the SCTP packet is equal to 0×1, and an LBI parameter carried in the data chunk of the second user terminal (namely, an application layer response message that is to be sent to the second user terminal) in the SCTP packet is equal to 0×2.

If the plurality of response messages of the plurality of user terminals cannot be sent by using the one SCTP packet, the network element selector 304 may send, to the host client endpoint 302 by using a plurality of SCTP packets, the plurality of response messages that are to be sent to the plurality of user terminals, or may split one response message into a plurality of response messages and separately send the plurality of response messages in a plurality of SCTP packets. This is not limited in this application.

Step S509. The host client endpoint 302 parses the received application layer response message, and records the LBI parameter corresponding to each user terminal. For example, in the example of FIG. 5, the host client endpoint 302 records that the LBI parameter corresponding to the first user terminal is equal to 0×1, and records that the LBI parameter corresponding to the second user terminal is equal to 0×2.

A plurality of interaction processes need to be performed between the host client endpoint 302 and the server, to complete an application service.

Therefore, step S510. The host client endpoint 302 sends a next SCTP packet to the network element selector 304. The SCTP packet includes the plurality of data chunks of the plurality of user terminals. In this case, the SCTP packet is also in a format shown in FIG. 4A, and each data chunk carries the LBI parameter corresponding to the user terminal. For example, the LBI parameter carried in the data chunk sent by the first user terminal is equal to 0×1, and the LBI parameter carried in the data chunk sent by the second user terminal is equal to 0×2.

Step S511. The network element selector 304 selects the corresponding server for the user terminal based on the LBI parameter in each data chunk, and forwards user data. For example, the LBI parameter carried in the data chunk sent by the first user terminal is equal to 0×1, and the LBI parameter carried in the data chunk sent by the second user terminal is 0×2. Therefore, the network element selector searches for a preconfigured correspondence between the LBI parameter and each server, and learns that the data chunk sent by the first user terminal needs to be sent to the server A and the data chunk sent by the second user terminal needs to be sent to the server B.

In the foregoing description, the SCTP is used as the transmission protocol between the host client endpoint 302 and the network element selector 304 in steps S502, S508, and S510. A transmission protocol between the network element selector 304 and each server is not limited in this application. Therefore, a format of the data chunk transmitted between the host client endpoint 302 and the network element selector 304 in steps S502 and S510 is shown in FIG. 4A. Optionally, a format of the data chunk transmitted in step S508 may be shown in FIG. 4A.

According to the solutions in the present disclosure, when the network element selector 304 receives a first interaction request of the user terminal, the LBI parameter corresponding to each user terminal is an invalid value, and the network element selector 304 selects the server for each user terminal based on the network load status of each server in the server cluster, and forwards the application layer request message. Then, the selected server allocates the LBI parameter to the corresponding user terminal, and returns the allocated LBI parameter to the host client endpoint 302. In a subsequent interaction process, when the host client endpoint 302 sends the data chunk of the user terminal, the data chunk carries the LBI parameter corresponding to the user terminal, and the network element selector 304 may select, for the user terminal based on the LBI parameter in the SCTP data chunk, a server corresponding to an interaction session of the user terminal, to implement load balancing oriented to a plurality of user characteristics in the SCTP packet, and implement session persistence.

FIG. 6 is a signaling interaction diagram of a communications method according to another embodiment of the present disclosure. Steps S601 to S604 and steps S608 to S611 in the embodiment provided in FIG. 6 are respectively the same as steps S501 to S504 and steps S508 to S511 in the embodiment provided in FIG. 5. Details are not described herein again. Different from FIG. 5, in this embodiment, each server does not need to allocate an LBI parameter, and merely needs to process user data of an application layer. The LBI parameter is allocated by a network element selector 304.

Specifically, step S605. After receiving the application layer request message, the server processes the application layer request message, generates a user context, and returns an application layer response message to the network element selector 304 in step S606.

Step S607. The network element selector 304 allocates an LBI parameter to each user terminal based on the application layer response message returned by the server.

In addition, an application layer response message that is to be sent to each user terminal and the LBI parameter corresponding to the user terminal are added by the network element selector 304 to each data chunk in the SCTP packet and sent to a host client endpoint 302 in a subsequent step S608.

In the example of FIG. 6, when the network element selector 304 receives a first interaction request of the user terminal, the LBI parameter corresponding to each user terminal is an invalid value, and the network element selector 304 selects the server for each user terminal based on the network load status of each server in the server cluster, and forwards the application layer request message. Then, the network element selector 304 allocates the LBI parameter to the corresponding user terminal, and returns the allocated LBI parameter to the host client endpoint 302. In a subsequent interaction process, when the host client endpoint 302 sends the data chunk of the user terminal, the data chunk carries the LBI parameter corresponding to the user terminal, and the network element selector 304 may select, for the user terminal based on the LBI parameter in the SCTP data chunk, a server corresponding to an interaction session, to implement load balancing oriented to a plurality of user characteristics in the SCTP packet, and implement session persistence.

FIG. 7 is a signaling interaction diagram of a communications method according to still another embodiment of the present disclosure. Steps S701 and S702 and steps S708 to S711 in the embodiment provided in FIG. 7 are respectively the same as steps S501 and S502 and steps S508 to S511 in the embodiment provided in FIG. 5. Details are not described herein again. In this embodiment, an LBI parameter is also allocated by a network element selector 304. Different from the embodiment in FIG. 6, when receiving a first interaction request of a user terminal, the network element selector 304 allocates an LBI parameter to the user terminal, and sends the LBI parameter and an application layer request message to a corresponding server.

Specifically, step S703. The network element selector 304 parses a data chunk of each user terminal in the SCTP packet, and determines that an LBI parameter in the data chunk is an invalid value, and the network element selector 304 selects a service providing server for each user terminal based on network load statuses of a plurality of servers in a server cluster. In addition, the network element selector 304 further allocates the LBI parameter in each data chunk based on the server selected for the user terminal.

Step S704. The network element selector 304 sends an application layer request message to each server.

The application layer request message carries user data of each user terminal and an LBI parameter corresponding to the user terminal. It should be noted that a transmission manner between the load balancer 304 and the server is not limited herein. The application layer request message between the load balancer 304 and the server may be sent based on the SCTP, or may be sent in another manner. For example, the application layer request message between the load balancer 304 and the server may be sent based on an extended transmission protocol.

Step S705. After receiving the application layer request message, the server processes the application layer request message, generates a user context, and returns an application layer response message to the network element selector 304 in step S706.

Step S707. The network element selector 304 encapsulates the application layer response message and the corresponding LBI parameter into the data chunk of the SCTP packet, so that the network element selector sends the data chunk to the host client end 302 by using the SCTP association in step S708.

In the example of FIG. 7, when the network element selector 304 receives a first interaction request of the user terminal, the LBI parameter corresponding to each user terminal is an invalid value, and the network element selector 304 selects the server for each user terminal based on the network load status of each server in the server cluster, allocates the LBI parameter to the user terminal, adds the LBI parameter to the SCTP packet that carries the application layer response message, returns the SCTP packet to the host client endpoint 302. In a subsequent interaction process, when the host client endpoint 302 sends the data chunk of the user terminal, the data chunk carries the LBI parameter corresponding to the user terminal, and the network element selector 304 may select, for the user terminal based on the LBI parameter in the SCTP data chunk, a server corresponding to an interaction session, to implement load balancing oriented to a plurality of user characteristics in the SCTP packet, and implement session persistence.

In addition, the present disclosure is not limited to a scenario of a single network element selector. In another embodiment, a plurality of network element selectors may be disposed in the front end of the server cluster. Optionally, in step S704, the network element selector 304 sends the application layer request message and the allocated corresponding LBI parameter to each server. For example, the LBI parameter carries an identifier of the network element selector 304. In step S705, each server may further record the received LBI parameter. For example, a server A records that the LBI parameter is equal to 0×1, and a server B records that the LBI parameter is equal to 0×2. The server may identify the network element selector based on the LBI parameter. Therefore, if a user context is to be migrated later, a user context of a same network element selector may be first migrated, to improve distribution efficiency of the network element selector.

In the embodiments of FIG. 5 to FIG. 7, optionally, a load balancing mechanism in which an LBI parameter is added to a data chunk may be merely for some specific application layer protocols such as the S1 Application Protocol (S1-AP) in a wireless network architecture. In this case, the host client endpoint 302 may determine, by using a PPI in the data chunk in the SCTP packet, whether to add the LBI parameter to the data chunk.

Figure 8:
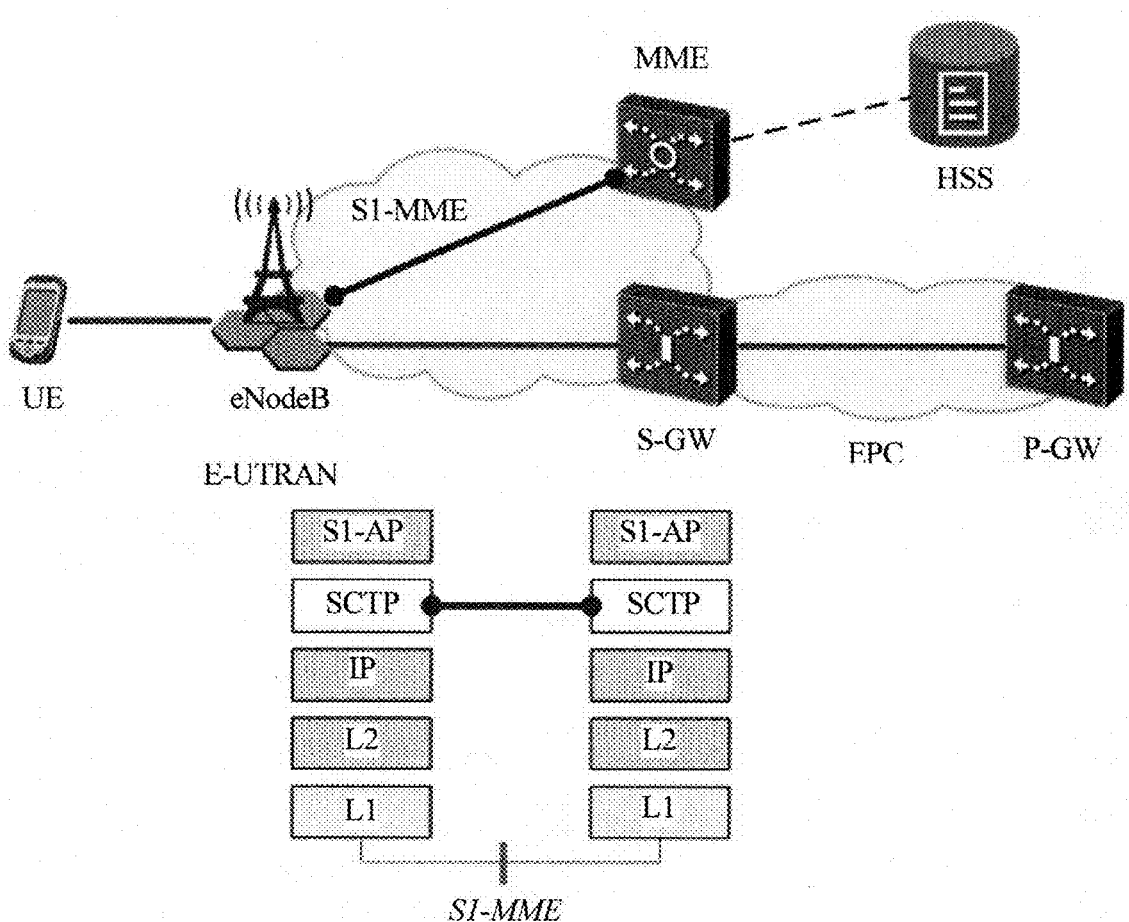
FIG. 8 is a schematic diagram of implementing a possible system network according to the present disclosure.

As shown in FIG. 8, the present disclosure is applied to an LTE system proposed by the 3rd Generation Partnership Project (3GPP). An eNodeB is used as a host client endpoint 302, and an MME is used as a service providing device for a user terminal, namely, a server. An S1-MME uses the SCTP as a transport layer bearer protocol between the eNodeB and the MME. A network element selector (for example, a network element selector 304) is disposed in the front end of a server cluster including a plurality of MMEs.

Figure 9:
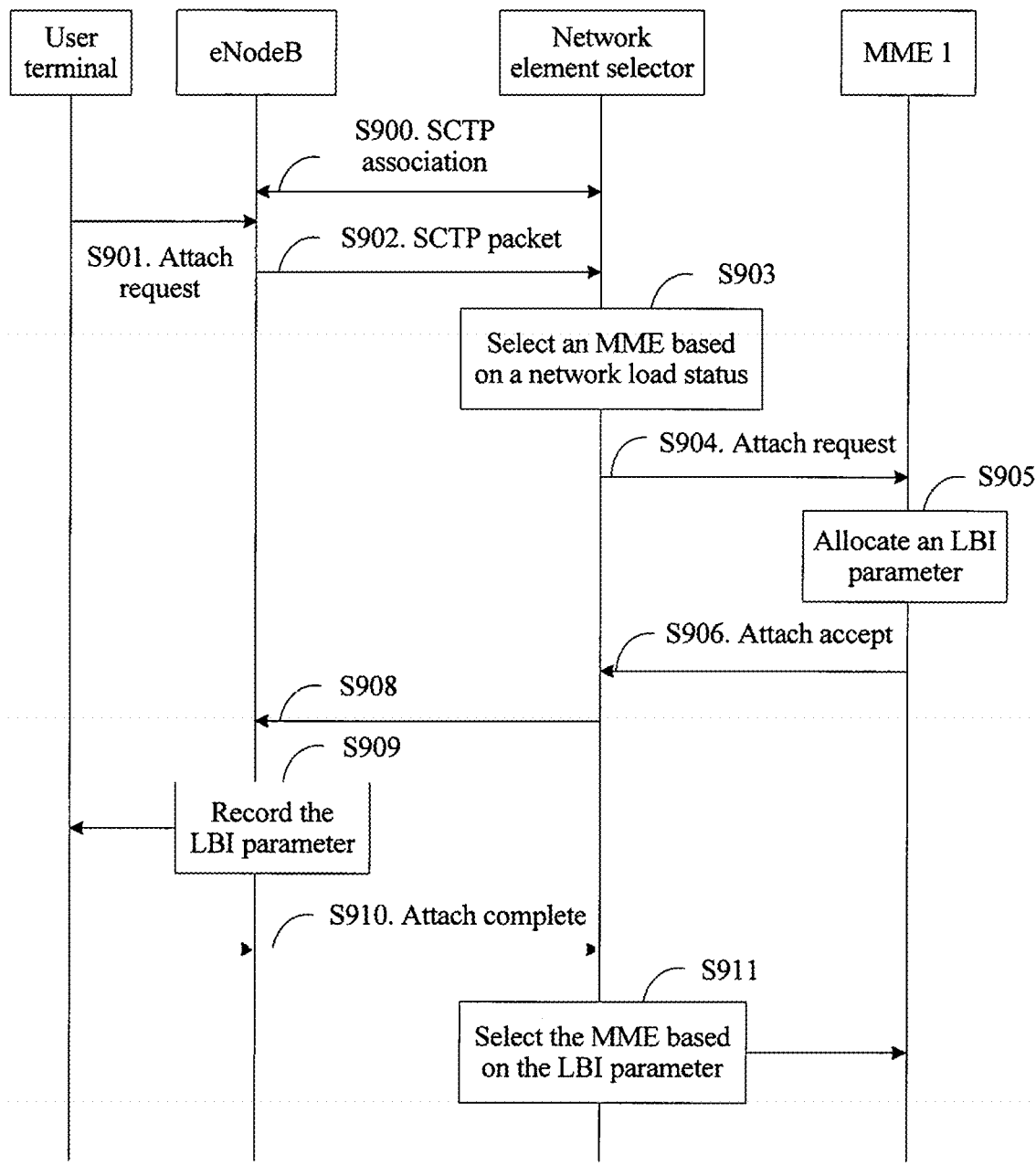
FIG. 9 is a schematic flowchart of applying the present disclosure to an LTE system network.

The embodiments of FIG. 5 to FIG. 7 may be applied to the LTE system in FIG. 8. As shown in FIG. 9, an example in which the embodiment of FIG. 5 is applied to an LTE system is used below for description. For example, in the LTE system, a plurality of user terminals access an eNodeB by using a proxy or through NAT, and then the eNodeB sends application layer messages of the plurality of user terminals by using an SCTP packet. In the example of FIG. 9, a server cluster includes a plurality of MMEs. For ease of description, only an MME 1 is shown in FIG. 9, and an operation performed by another MME is similar to that of the MME 1.

Step S900. An SCTP association is established between an eNodeB and a network element selector.

For step S900, refer to the description in S501. In addition, because the SCTP association is implemented by using a connection between S1 interfaces, the SCTP association may also be referred to as an S1 connection.

Step S901. Each user terminal (for example, a first user terminal) sends an attach request message to the eNodeB.

Step S902. The eNodeB sends an SCTP packet to the network element selector by using the established SCTP association. A plurality of data chunks of a plurality of user terminals are bundled in the SCTP packet. Each data chunk includes an attach request message of a user terminal.

Step S903. The network element selector parses a data chunk of each user terminal in the SCTP packet, and determines that an LBI parameter in the data chunk is an invalid value, and the network element selector selects an MME for each user terminal based on load statuses of a plurality of servers in a server cluster. For example, the network element selector selects the MME 1 for the first user terminal.

Step S904. The network element selector sends an attach request message to an MME 1. For example, the GPRS (general packet radio service) tunneling protocol (GTP) is used as a bearer between the network element selector and the MME 1 to send the attach request message.

Step S905. The MME 1 processes the attach request message, and generates a user context. In addition, the MME 1 further allocates an LBI parameter to the first user terminal. For example, the LBI parameter is equal to 0×1.

Step S906. The MME 1 feeds back an attach accept message to the network element selector. A (GUMMEI) parameter in the attach accept message is used as the LBI parameter. Alternatively, an MME S1-AP UE ID in a bearer message (an S1-AP message) of the attach accept message is used as the LBI parameter.

Step S908. The network element selector sends, to the eNodeB by using the SCTP association, an SCTP packet that carries the attach accept message.

Step S909. After receiving and parsing the SCTP packet, the eNodeB records an LBI parameter corresponding to each user terminal, and forwards the attach accept message to a corresponding user terminal (for example, the first user terminal).

Step S910. UE sends an attach complete message to the eNodeB. The eNodeB encapsulates the attach complete message into the SCTP packet, queries the LBI parameter corresponding to the user terminal, adds the corresponding LBI parameter to a data chunk in which the attach complete message is located, and sends the data chunk to the network element selector. For example, the eNodeB learns, through querying, that the LBI parameter corresponding to the first user terminal is equal to 0×1, adds the LBI parameter that is equal to 0×1 to the data chunk in which the attach complete message is located, and sends the data chunk to the network element selector.

Step S911. After receiving the SCTP packet, the network element selector selects the MME tor the user terminal based on the LBI parameter in the data chunk of the SCTP packet, and forwards the attach complete message. For example, the network element selector determines, based on the LBI parameter that is equal to 0×1 and a correspondence obtained in step S907, to select the MME 1 for the first user terminal, and sends the attach complete message to the MME 1.

According to the method in the embodiment of FIG. 9, for the attach procedure of the user terminal, interaction needs to be performed with the MME for a plurality of times. When the network element selector receives the attach request message of the user terminal, because the LBI parameter corresponding to the user terminal is an invalid value, the network element selector selects the MME for each user terminal based on a load status, and forwards the attach request message. Then, the selected MME allocates the LBI parameter to the corresponding user terminal, and returns the allocated LBI parameter to the eNodeB by using the attach accept message. In a subsequent interaction process, the eNodeB forwards the attach complete message of the user terminal to the network element selector. Because the attach complete message carries the corresponding LBI parameter, the network element selector may select the previous MME for the user terminal based on the LBI parameter for processing. Therefore, load balancing oriented to a plurality of user characteristics in the SCTP packet is implemented, and session persistence is implemented.

When the LTE system in FIG. 8 is applied to the embodiment of FIG. 6 or FIG. 7, the LBI parameter is allocated by the network element selector. For details, refer to the description in FIG. 6 or FIG. 7. Details are not described herein again.

The solutions provided in the embodiments of the present disclosure are mainly described above from a perspective of interaction between network elements. It may be understood that, to implement the foregoing functions, each network element such as the host client endpoint 302 (for example, the base station), the network element selector 304, or the server (for example, the MME) includes corresponding hardware structures and/or software modules for implementing various functions. A person skilled in the art should be easily aware that the units and algorithm steps in each example described with reference to the embodiments disclosed in this specification may be implemented in a form of hardware or a combination of hardware and computer software in the present disclosure. Whether the functions are implemented by hardware or are implemented in a manner in which computer software drives hardware depends on particular applications and design constraint conditions of the technical solutions. A person skilled in the art may use different methods to implement the described functions for each particular application, but it should not be considered that the implementation goes beyond the scope of the present disclosure.

Figure 10:
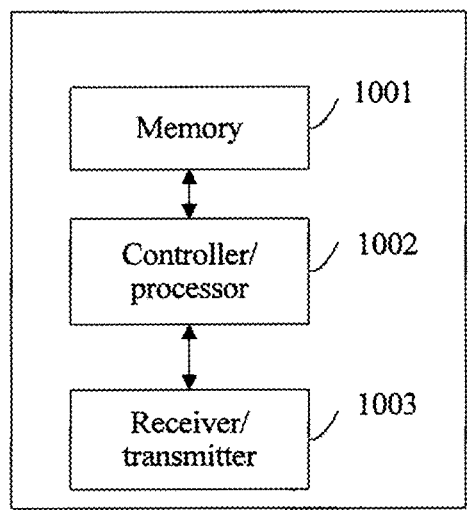
FIG. 10 is a schematic structural diagram of a network element selector according to an embodiment of the present disclosure.

FIG. 10 is a design block diagram of an apparatus (for example, a network element selector 304) used in the foregoing embodiments. The apparatus includes a controller/processor 1002, a memory 1001, and a receiver/transmitter 1003. The controller/processor 1002 is configured to: control and manage an action of the apparatus, and implement various functions to support balanced processing on a server cluster. For example, the controller/processor 1002 is configured to support the apparatus in executing the process S404 in FIG. 4B, the processes S503, S507, and S511 in FIG. 5, the processes S603, S607, and S611 in FIG. 6, the processes S703, S707, and S711 in FIG. 7, the processes S903, S907, and S911 in FIG. 9, and/or another process of a technology described in this specification. The memory 1001 is configured to store program code and data of the apparatus. The receiver/transmitter 1003 is configured to support communication with each entity in a network. For example, the receiver/transmitter 1003 is configured to support communication with the host client endpoint or each server in FIG. 5 to FIG. 7 and in FIG. 9.

Figure 11:
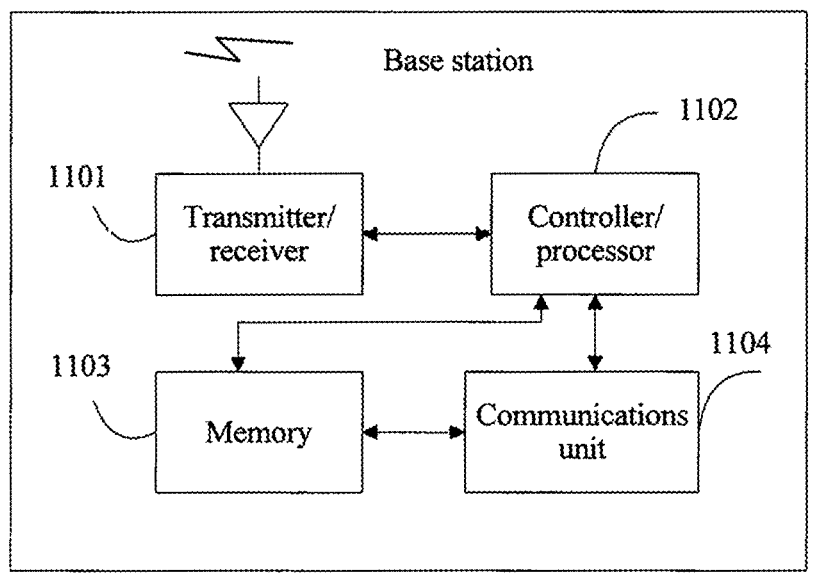
FIG. 11 is a schematic structural diagram of a host client endpoint (for example, a base station) according to an embodiment of the present disclosure.

FIG. 11 is a possible schematic structural diagram of a host client endpoint (for example, a base station 302) used in the foregoing embodiments.

The base station includes a transmitter/receiver 1101, a controller/processor 1102, a memory 1103, and a communications unit 1104. The transmitter/receiver 1101 is configured to support information receiving and sending between the base station and the network element selector in the foregoing embodiment. For details, refer to the descriptions in FIG. 5 to FIG. 7 or in FIG. 9. The controller/processor 1102 controls and manages an action of the apparatus, and implements various functions to support balanced processing on a server cluster. For example, the controller/processor 1102 is configured to support the apparatus in executing the process S509 in FIG. 5, the process S609 in FIG. 6, the process S709 in FIG. 7, the process S909 in FIG. 9, and/or another process of a technology described in this specification.

In addition, the controller/processor 1102 is further configured to control and manage a function of communicating with a user terminal. In an uplink, an uplink signal from the user terminal is received by an antenna, demodulated by the receiver 1101, and processed by the controller/processor 1102, to restore service data and signaling information that are sent by the user terminal. In a downlink, service data and a signaling message are processed by the controller/processor 1102 and demodulated by the transmitter 1101, to generate a downlink signal. The downlink signal is transmitted by an antenna to the user terminal. The memory 1103 is configured to store program code and data of the base station. The transmitter/receiver 1101 may be further configured to support communication between the base station and another network entity. For example, the transmitter/receiver 1101 is configured to support communication between the base station and another communications network entity shown in FIG. 8, for example, an HSS, an SGW, or a PGW in a core network EPC.

It may be understood that FIG. 11 merely shows a simplified design of the base station. In an actual application, the base station may include any quantity of transmitters, receivers, processors, controllers, memories, communications units, and the like, and all base stations that can implement the present disclosure fall within the protection scope of the present disclosure.

Figure 12:
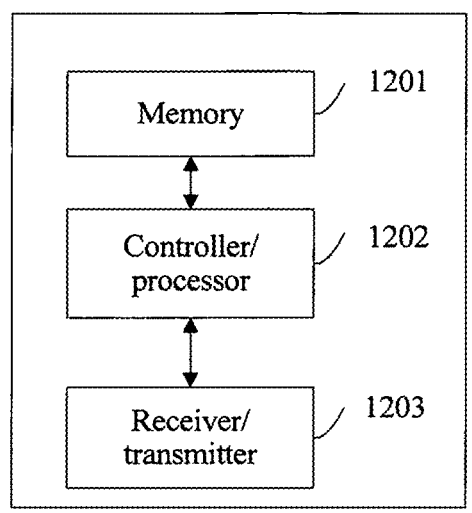
FIG. 12 is a schematic structural diagram of a server (for example, a mobility management entity) according to an embodiment of the present disclosure.

FIG. 12 is a design block diagram of a server (for example, a core network apparatus in a core network) used in the foregoing embodiments. The core network may be an EPC network, and the core network apparatus may be an MME, an SGW, a PGW, or any combination thereof.

The core network apparatus includes a controller/processor 1202, a memory 1201, and a receiver/transmitter 1203. The controller/processor 1202 is configured to: control and manage an action of the core network apparatus, and implement various functions to support communication with a network element selector. For example, the controller/processor 1202 is configured to support the core network apparatus in executing the process S505 in FIG. 5, the process S605 in FIG. 6, the process S705 in FIG. 7, the process S905 in FIG. 9, and/or another process of a technology described in this specification. The memory 1201 is configured to store program code and data of the core network apparatus. The receiver/transmitter 1203 is configured to support communication with the network element selector, and support communication with another communications network entity shown in FIG. 8.

The controller/processor configured to implement functions of the network element selector, the base station, or the core network apparatus in the present disclosure may be a central processing unit (CPU), a general purpose processor, a digital signal processor (DSP), an application-specific integrated circuit (ASIC), a field programmable gate array (FPGA) or another programmable logical device, a transistor logical device, a hardware component, or any combination thereof. The controller/processor may implement or execute various example logical blocks, modules, and circuits described with reference to content disclosed in the present disclosure. The processor may also be a combination of computing functions, for example, a combination of one or more microprocessors or a combination of a DSP and a microprocessor.

The methods or algorithm steps described with reference to the content disclosed in the present disclosure may be implemented in a hardware manner, or may be implemented in a manner of executing a software instruction by a processor. The software instruction may include a corresponding software module. The software module may be stored in a RAM memory, a flash memory, a ROM memory, an EPROM memory, an EEPROM memory, a register, a hard disk, a removable hard disk, a CD-ROM memory, or a storage medium in any other forms well-known in the art. A storage medium used as an example is coupled to the processor, so that the processor can read information from the storage medium, and can write information into the storage medium. Certainly, the storage medium may be a part of the processor. The processor and the storage medium may be located in an ASIC. In addition, the ASIC may be located in a user terminal. Certainly, the processor and the storage medium may exist in the user terminal as discrete components.

A person of skill in the art should be aware that in one or more of the foregoing examples, the functions described in the present disclosure may be implemented by using hardware, software, firmware, or any combination thereof. When this application is implemented by software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general or dedicated computer.

The objectives, technical solutions, and benefit effects of the present disclosure are further described in detail in the foregoing specific embodiments. It should be understood that the foregoing descriptions are merely specific embodiments of the present disclosure, but are not intended to limit the protection scope of the present disclosure. Any modification, equivalent replacement, or improvement made based on the technical solutions of the present disclosure shall fall within the protection scope of the present disclosure.

What is claimed is:

1. A Stream Control Transmission Protocol (SCTP)-based communications method, comprising:
   receiving, by a network element selector, an SCTP packet, wherein the SCTP packet comprises a plurality of SCTP data chunks of a plurality of user terminals, and each SCTP data chunk carries index information; and
   selecting, by the network element selector, a service providing device for each user terminal based on the index information carried in each SCTP data chunk, wherein selecting, by the network element selector, a service providing device for each user terminal based on the index information carried in each SCTP data chunk comprises:
      when index information carried in a first SCTP data chunk sent by a first user terminal in the plurality of user terminals has a first value, selecting, by the network element selector for the first user terminal based on network load statuses of a plurality of service providing devices, a first device in the plurality of service providing devices to serve as the service providing device.

2. The method according to claim 1, wherein selecting, by the network element selector, a service providing device for each user terminal based on the index information carried in each SCTP data chunk comprises:
   when index information carried in a second SCTP data chunk of a first user terminal in the plurality of user terminals has a second value, and the index information having the second value is used to identify a second device in a plurality of service providing devices, selecting, by the network element selector for the first user terminal based on the second value, the second device as the service providing device.

3. The method according to claim 2, wherein before receiving, by a network element selector, an SCTP packet, the method further comprises:
   obtaining, by the network element selector, the index information corresponding to the first user terminal, wherein the index information has the second value; and
   sending, by the network element selector, an SCTP packet carrying the index information to a host client endpoint for recording the index information corresponding to the first user terminal.

4. The method according to claim 3, wherein obtaining, by the network element selector, the index information corresponding to the first user terminal comprises:
   receiving, by the network element selector, a third SCTP data chunk sent by the first user terminal, wherein the third SCTP data chunk carries user data of the first user terminal and index information having a first value;
   selecting, by the network element selector, the second device for the first user terminal based on network load statuses of the plurality of service providing devices; and
   allocating, by the network element selector, the index information having the second value to the first user terminal, wherein the index information having the second value is used to identify the second device.

5. The method according to claim 4, wherein after allocating, by the network element selector, the index information having the second value to the first user terminal, the method further comprises:
   sending, by the network element selector, a request message to the second device, wherein the request message carries the user data of the first user terminal and the index information that has the second value and is corresponding to the first user terminal.

6. The method according to claim 3, wherein obtaining, by the network element selector, the index information corresponding to the first user terminal comprises:
   receiving, by the network element selector, a third SCTP data chunk sent by the first user terminal, wherein the third SCTP data chunk carries user data of the first user terminal and index information having a first value;
   selecting, by the network element selector, the second device for the first user terminal based on network load statuses of the plurality of service providing devices;
   sending, by the network element selector, a request message to the second device for allocating the index information having the second value to the first user terminal; and
   receiving, by the network element selector, a response message from the second device, wherein the response message is used to indicate that the index information has the second value, and the index information having the second value is used to identify the second device.

7. An apparatus, comprising:
   a receiver, the receiver configured to receive a Stream Control Transmission Protocol (SCTP) packet, wherein the SCTP packet comprises a plurality of SCTP data chunks of a plurality of user terminals, and wherein each SCTP data chunk carries index information; and
   at least one processor, the at least one processor configured to select a service providing device for each user terminal based on the index information carried in each SCTP data chunk, wherein when index information carried in a first SCTP data chunk sent by a first user terminal in the plurality of user terminals has a first value, the at least one processor is configured to select, for the first user terminal based on network load statuses of a plurality of service providing devices, a first device in the plurality of service providing devices to serve as the service providing device.

8. The apparatus according to claim 7, wherein when index information carried in a second SCTP data chunk of a first user terminal in the plurality of user terminals has a second value, and the index information having the second value is used to identify a second device in a plurality of service providing devices, the at least one processor is configured to select, for the first user terminal based on the second value, the second device as the service providing device.

9. The apparatus according to claim 8, wherein:
before the receiver receives the SCTP packet, the at least one processor is further configured to obtain the index information corresponding to the first user terminal, wherein the index information has the second value; and
the apparatus further comprises a transmitter, the transmitter configured to send an SCTP packet carrying the index information to a host client endpoint for recording the index information corresponding to the first user terminal.

10. The apparatus according to claim 9, wherein:
the receiver is further configured to receive a third SCTP data chunk sent by the first user terminal, wherein the third SCTP data chunk carries user data of the first user terminal and index information having a first value; and
the at least one processor is configured to:
select the second device for the first user terminal based on network load statuses of the plurality of service providing devices, and
allocate the index information having the second value to the first user terminal, wherein the index information having the second value is used to identify the second device.

11. The apparatus according to claim 10, wherein after the at least one processor allocates the index information having the second value to the first user terminal, the transmitter is further configured to send a request message to the second device, wherein the request message carries the user data of the first user terminal and the index information that has the second value and is corresponding to the first user terminal.

12. The apparatus according to claim 9, wherein:
the receiver is further configured to receive a third SCTP data chunk sent by the first user terminal, wherein the third SCTP data chunk carries user data of the first user terminal and index information having a first value;
the at least one processor is configured to select the second device for the first user terminal based on network load statuses of the plurality of service providing devices;

the transmitter is configured to send a request message to the second device for allocating the index information having the second value to the first user terminal; and
the receiver is configured to receive a response message from the second device, wherein the response message is used to indicate that the index information has the second value, and the index information having the second value is used to identify the second device.

13. A Stream Control Transmission Protocol (SCTP)-based communications system, comprising:
a plurality of service providing devices; and
a network element selector separately connected to the plurality of service providing devices and configured to:
receive an SCTP packet, wherein the SCTP packet comprises a plurality of SCTP data chunks of a plurality of user terminals, and each SCTP data chunk carries index information, and
select a service providing device for each user terminal from the plurality of service providing devices based on the index information carried in each SCTP data chunk, wherein when index information carried in a first SCTP data chunk sent by a first user terminal in the plurality of user terminals has a first value, the network element selector is configured to select, for the first user terminal based on network load statuses of the plurality of service providing devices, a first device in the plurality of service providing devices to serve as the service providing device.

14. The communications system according to claim 13, wherein the first device is further configured to allocate index information having a second value to a first user terminal.

15. The communications system according to claim 13, wherein the network element selector is further configured to allocate index information having a second value to the first user terminal.

16. The communications system according to claim 13, wherein when index information carried in a second SCTP data chunk of the first user terminal in the plurality of user terminals has a second value, and the index information having the second value is used to identify a second device in the plurality of service providing devices, the network element selector is configured to select, for the first user terminal based on the second value, the second device as the service providing device.

* * * * *